US012689129B2

(12) United States Patent
Wrigley et al.

(10) Patent No.: US 12,689,129 B2
(45) Date of Patent: Jul. 21, 2026

(54) HORN ANTENNAS WITH INTEGRATED FEEDS

(71) Applicant: Lockheed Martin Corporation, Bethesda, MD (US)

(72) Inventors: Jason Stewart Wrigley, Littleton, CO (US); Frank Lucchesi, Burnsville, MN (US); Nathan Jastram, Highlands Ranch, CO (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 121 days.

(21) Appl. No.: 18/611,170

(22) Filed: Mar. 20, 2024

(65) Prior Publication Data

US 2025/0300356 A1 Sep. 25, 2025

(51) Int. Cl.
*H01Q 15/24* (2006.01)
*H01Q 13/02* (2006.01)

(52) U.S. Cl.
CPC ........... *H01Q 13/025* (2013.01); *H01Q 15/24* (2013.01)

(58) Field of Classification Search
None
See application file for complete search history.

(56) References Cited

U.S. PATENT DOCUMENTS 6,703,976 B2 3/2004 Jacomb-Hood et al.
8,525,616 B1 9/2013 Shaw et al.
8,957,821 B1 2/2015 Rao et al.
9,478,838 B2 * 10/2016 Wolf ........................ H01P 1/171
9,748,623 B1 * 8/2017 Lee-Yow ................ H01P 1/161
9,972,897 B1 * 5/2018 Rao ....................... H01Q 21/064
10,320,085 B1 6/2019 Lier et al.
(Continued)

FOREIGN PATENT DOCUMENTS

CN 210326060 U * 4/2020
EP 3893323 A1 * 10/2021 .............. H01P 1/161
GB 2359197 A * 8/2001 ............ H01P 1/2138

OTHER PUBLICATIONS

Addamo et al., 3D Printing of a Monolithic K/Ka-Band Dual-Circular Polarization Antenna-Feeding Network, Jun. 2021, IEEE Access, vol. 9, pp. 88243-88255 (Year: 2021).*
(Continued)

*Primary Examiner* — Dameon E Levi
*Assistant Examiner* — Anh Ho

(57) ABSTRACT

Provided herein are various enhancements for feed networks and aperture assemblies in radio frequency transmit/receive systems. In one example an apparatus includes a horn aperture integrated with a multimode feed network that can be monolithically fabricated in a single piece. The multimode feed network comprises a first feed section coupled between a first feed port and a first polarizer port of a polarizer and comprising a first waveguide filter and first waveguide stubs establishing first transmission zeros. The multimode feed network also includes a second feed section coupled between a second feed port and a second polarizer port of the polarizer and comprising a second waveguide filter and second waveguide stubs establishing second transmission zeros. The polarizer comprises a stepped septum positioned between the first polarizer port and the second polarizer port and having a shared port coupled to the horn aperture.

20 Claims, 8 Drawing Sheets

(56) References Cited

U.S. PATENT DOCUMENTS

| | | | | |
|---|---|---|---|---|
| 10,665,931 | B2 | 5/2020 | Lier et al. | |
| 10,749,252 | B1 | 8/2020 | Lier et al. | |
| 10,777,898 | B2 * | 9/2020 | Palreddy | H01Q 5/55 |
| 11,228,116 | B1 * | 1/2022 | Wrigley | H01Q 21/0037 |
| 11,552,412 | B2 | 1/2023 | Wink et al. | |
| 11,881,607 | B1 | 1/2024 | Wrigley | |
| 2002/0000945 | A1 | 1/2002 | Amyotte et al. | |
| 2002/0159733 | A1 | 10/2002 | Flory et al. | |
| 2005/0104791 | A1 | 5/2005 | Sun et al. | |
| 2005/0259026 | A1 | 11/2005 | Cook | |
| 2006/0158382 | A1 | 7/2006 | Nagai | |
| 2007/0296641 | A1 | 12/2007 | Cook | |
| 2011/0205136 | A1 | 8/2011 | Runyon et al. | |
| 2014/0022137 | A1 | 1/2014 | Bosshard et al. | |
| 2016/0020520 | A1 | 1/2016 | McCarrick et al. | |
| 2017/0077610 | A1 | 3/2017 | Bongard et al. | |
| 2017/0256864 | A1 * | 9/2017 | Jensen | H01Q 13/0241 |
| 2019/0044223 | A1 * | 2/2019 | Lier | H01P 1/2138 |
| 2021/0257740 | A1 * | 8/2021 | Cartaillac | H01Q 15/0026 |
| 2025/0079715 | A1 * | 3/2025 | Mu | H01Q 13/02 |

OTHER PUBLICATIONS

Jazani, Ghoncheh et al., "Design of Dual-Polarized (RHCP/LHCP) Quad-Ridged Horn Antenna With Wideband Septum Polarizer Wave Guide Feed," IET Microwaves, Antennas & Propagation, vol. 12, Iss. 9, pp. 1541-1545, 2018.

Ordek, Sezgin et al., "Horn Array Antenna Design for Ku-Band Applications," 2015 9th International Conference on Electrical and Electronics Engineering, pp. 351-354, Nov. 26-28, 2015.

Silver, Samuel, "Microwave Antenna Theory And Design," First Edition, 10.15 The Box Horn,, pp. 377-380, 1949.

Vettikalladi, Hamsakutty et al., "High Gain And High Efficient Stacked Antenna Array With Integrated Horn For 60 GHz Communication Systems," International Journal of Antennas and Propagation, vol. 2014, 9 pages, Apr. 22, 2014.

Young, Leo et al., "Meander-Line Polarizer," IEEE Transactions on Antennas and Propagation, pp. 376-378, May 1973.

Zhang, J. C. et al., "Multifunctional Meander Line Polarizer," Progress in Electromagnetics Research Letters, vol. 6, pp. 55-60, 2009.

Chan, et al.; "Design of High Efficiency Circular Horn Feeds for Multibeam Reflector Applications"; IEEE Transactions on Antennas and Propagation; Jan. 2008; pp. 253-258; vol. 56, No. 1; IEEE.

* cited by examiner

HORN ANTENNAS WITH INTEGRATED FEEDS

TECHNICAL BACKGROUND

Aperture antennas are a form of radio frequency (RF) antenna used for directed transmission and reception of various RF signals, often employed in microwave radio transmissions or in reflector antenna feed systems. One example aperture antenna, a horn aperture antenna, comprises a source port which feeds into a flared volume defined by conductive walls. This horn aperture then transmits/receives signals to/from external nodes. Arrays of horn antennas can be formed and used to produce active or passive Electronically Steerable Arrays (ESAs). ESAs are often deployed on satellites placed into various orbital configurations for communication with earth-based stations over a range of aiming configurations. When employed for microwave and millimeter-wave RF applications, horn arrays and connected waveguide filters offer low loss and high efficiency as compared to other antenna types.

Along with the horn apertures, other components are often employed in concert to form an antenna system. These other components can be referred to as a feed network and include polarizers, filters, waveguides, interfacing elements, and other RF components. For example, polarizers can be employed in RF feed networks which convert polarizations of signals between linear and circular polarizations, and vice-versa. Typically, these components are manufactured from separate metallic workpieces which are then screwed or bolted together to form individual horn antennas, and many individual horn antennas are then bolted together to form large arrays. Unfortunately, such arrangements have high complexity and high mass, and require complex manufacturing processes to assemble and ensure proper alignment and RF interfacing between separate pieces. This can limit applications and performance of horn antennas on weight-sensitive satellite-mounted ESA systems.

SUMMARY

Provided herein are various enhancements for radio frequency (RF) horn aperture antennas and feed network systems that integrate horn antenna elements with associated feed networks. The integrated feed network with horn apertures can be additively manufactured (e.g., 3D printed) into a single monolithic workpiece and include transmission zeros all within a footprint or envelope of the horn aperture. Arrays of such integrated assemblies can be formed into compact, reduced mass/weight configurations for use in large Electronically Steerable Arrays (ESAs) and other arrays of horn apertures. Thus, aperture assemblies discussed herein advantageously provide for a compact and robust arrangement having two bandpass waveguide filters each with two rejection nulls, establishing multimode operations. Flexibility in characteristic frequencies for these rejection nulls is provided such that various high-side or low-side nulls can be selected.

In one example an apparatus includes a horn aperture integrated with a multimode feed network. The multimode feed network comprises a first feed section coupled between a first feed port and a first polarizer port of a polarizer and comprising a first waveguide filter and first waveguide stubs establishing first transmission zeros. The multimode feed network also includes a second feed section coupled between a second feed port and a second polarizer port of the polarizer and comprising a second waveguide filter and second waveguide stubs establishing second transmission zeros. The polarizer comprises a stepped septum positioned between the first polarizer port and the second polarizer port and having a shared port coupled to the horn aperture.

In another example, a method of manufacturing a radio frequency assembly is provided. This method includes forming a horn aperture integrated with a multimode feed network. The multimode feed network is formed to comprise a first feed section coupled between a first feed port and a first polarizer port of a polarizer and comprising a first waveguide filter and first waveguide stubs establishing first transmission zeros. The multimode feed network is formed to comprise a second feed section coupled between a second feed port and a second polarizer port of the polarizer and comprising a second waveguide filter and second waveguide stubs establishing second transmission zeros. The polarizer is formed to comprise a stepped septum positioned between the first polarizer port and the second polarizer port and having a shared port coupled to the horn aperture.

In yet another example, a radio frequency aperture assembly is provided comprising a horn aperture and a feed network. The feed network comprises a transmit feed section coupled between a transmit feed port and a transmit polarizer port of a polarizer and comprising a transmit waveguide filter and transmit waveguide stubs establishing first transmission zeros. The feed network comprises a receive feed section coupled between a receive feed port and a receive polarizer port of the polarizer and comprising a receive waveguide filter and receive waveguide stubs establishing second transmission zeros. The polarizer comprises a stepped septum positioned between the transmit polarizer port and the receive polarizer port and having a shared port coupled to the horn aperture.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Figure 1:
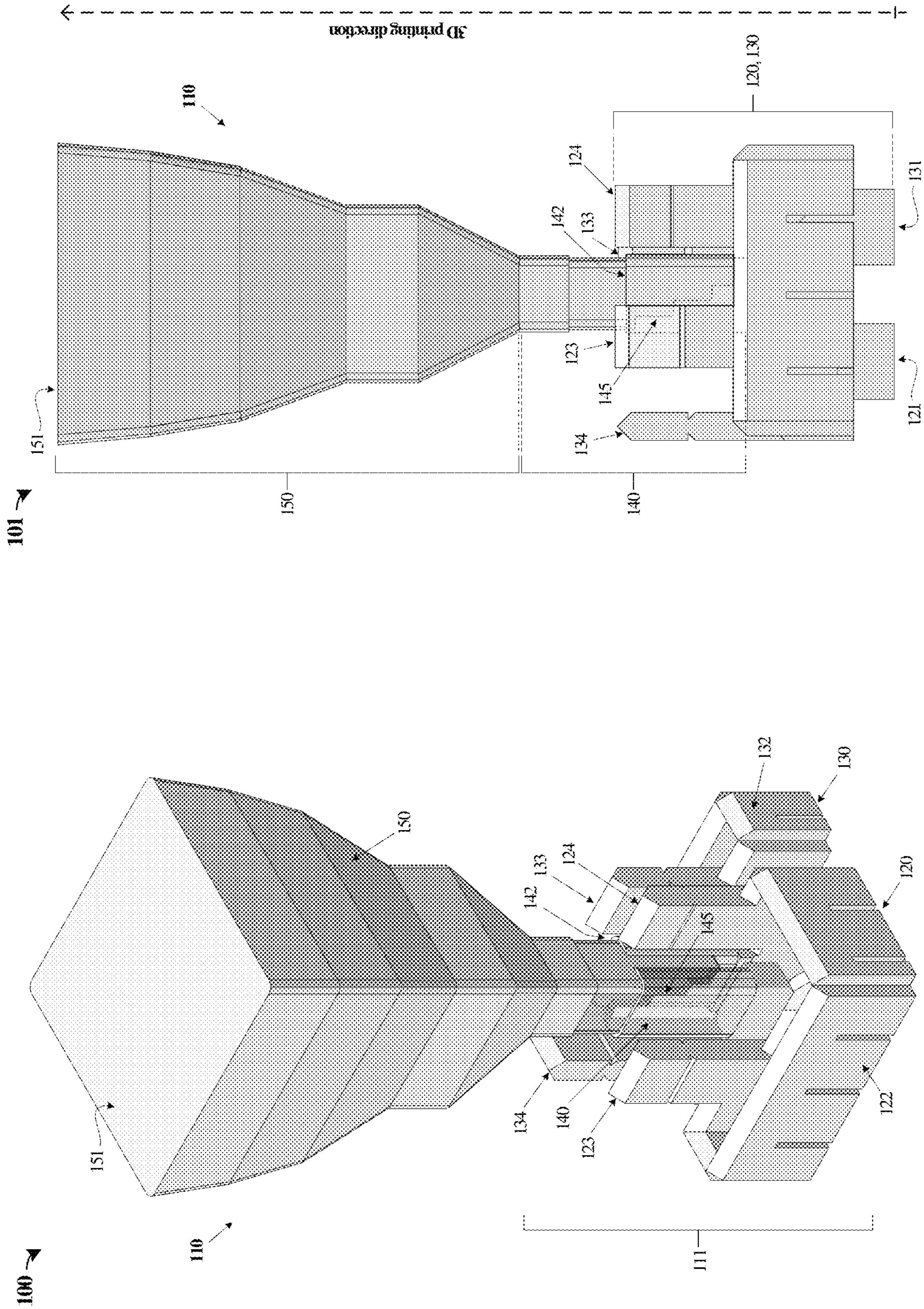
FIG. 1 illustrates an aperture antenna assembly in an implementation.

Provided herein are various enhanced radio frequency (RF) aperture and waveguide structures used to establish integrated horn aperture antenna and waveguide feed network configurations. Aperture antennas are often employed in microwave RF transmissions, such as in directional antenna feed systems or direct-radiating antenna systems. Aperture antennas and associated arrays are a class of antennas which emit RF energy from a corresponding aperture or opening, and include horn antennas, short backfire antennas, and waveguide aperture antennas. Large arrays of such antennas, perhaps using hundreds of elements, can form active or passive electronically steerable arrays (ESAs) for satellite communications, terrestrial backbone communications, aircraft communications, radar systems, directed energy applications, and other various applications using signal phase shifting and attenuation beamforming circuits among each antenna of the array to achieve a desired beam directionality and shaping.

In one example, a horn aperture antenna comprises a source port which feeds into a flared volume surrounded by walls that define the general shape of the horn aperture antenna. Along with the horn aperture antennas, other components are often employed in series to form an aperture antenna assembly. These other components can be referred to as a feed network and can include polarizers, filters, waveguides, ports, interfacing elements, and other RF components. Arrays of aperture antenna assemblies can be formed by joining together many individually manufactured antenna assemblies or by forming a plurality of antenna assemblies with a unified workpiece.

These enhanced waveguide and antenna structures are suitable for various manufacturing techniques including additive manufacturing (AM), also referred to as 3D printing. AM techniques can include various manufacturing processes suitable for metal or metal alloy materials such as Direct Metal Laser Sintering (DMLS), stereolithography (SLA), selective laser sintering (SLS), among others. Other examples include polymer or non-conductive material 3D printing which then have RF-contacting surfaces coated, plated, or deposited with layers of conductive material. Thus, while the specific AM techniques employed can vary, the enhanced structures discussed herein can provide desired performance over selected frequency ranges. However, use of AM techniques to completely manufacture antenna assemblies or arrays of antenna assemblies has been limited due to challenges in forming internal cavities and other various feed network features, especially for the small feature sizes for RF wavelengths of the X-band (approximately 8 to 12 GHZ), Ku-band (approximately 12 to 18 GHz), Ka-band (approximately 26.5-40 GHz), or millimeter wavelength bands. It should be understood that other RF bands and wavelengths can be supported with accompanying scaling in size or geometry suitable to the corresponding wavelengths.

Discussed herein are several enhanced techniques and structures for producing full duplex aperture antennas having integrated feed networks, while allowing for various manufacturing techniques such as AM or 3D printing. A traditional approach is to manufacture each horn and corresponding feed network elements (e.g. polarizer and filter elements), as individual components employing mechanical joints or connections between the components as well as using multiple assemblies within the components, such as split blocks. This traditional approach results in a less compact (i.e., longer/taller) structure along with higher recurring costs, higher assembly costs and time, higher testing labor, and higher mass to achieve a complete horn array assembly. Higher recurring costs are at least partly driven by the need for fabrication and testing at the component and higher assembly levels. A complete assembly then results in higher mass from the additional mechanical structure required for component assembly. In addition, critical performance parameters such as axial ratio and overall insertion loss can be impacted. The examples discussed herein can form a horn aperture antenna, along with integrated polarizer, filters, and ports, as a single integrated or monolithic component. Arrays of one or more antenna assemblies can also be formed as a single integrated or monolithic component. The antenna assemblies can employ a meandered or serpentine approach for filter cavities and other waveguide components to fit within a compact mechanical envelope. Additionally, the polarizers and associated horn apertures can utilize a square aperture which provides higher spatial efficiency and performance when deployed in an array. Circular, triangular, hexagonal, or irregular horn antennas can instead be employed using similar techniques.

The examples in the various Figures include both manufactured views and air cavity views. An air cavity view comprises a volume or space internal to a waveguide or other RF structure, such that the view shows cavities, spaces, channels, conduits, or other features through which RF energy can propagate or resonate. In contrast, manufactured views show various material provided to form walls or structures around the air cavities, with conductive surfaces typically in contact with the air cavities. Variations on the manufactured implementation can be employed based on application, and thus the air cavity view provides an illustration of the functional or RF-active portions of a waveguide structure.

Various terms are employed herein to describe RF structures and waveguide elements. The electric plane, or E-plane, is a plane defined by the direction of a transverse electric field in a waveguide. Often, this corresponds to a vertical axis along a waveguide. The magnetic plane, or H-plane, is a plane defined by the direction of the transverse magnetic field in a waveguide. Often, this corresponds to the horizontal axis along a waveguide. Discontinuities in a waveguide can include those in the E-plane (a discontinuity in vertical height), H-plane (a discontinuity in horizontal width), or combinations of the two.

Materials employed for the elements of the feed networks and horn apertures (or any of the various components discussed herein) can include any material having a conductive surface proximate to RF signaling. In some examples, the thickness can be selected to allow for successful manufacturing using a selected process, such as additive manufacturing, laser powder bed fusion, selective laser sintering (SLS), powder bed fusion (PBF), casting, injection molding, electroform, electrical discharge machining (EDM), machining, stamped metal, or other techniques. Any suitable conductive material including copper, aluminum, various metals or metallic alloys, or conductive carbon allotropes if associated conductive properties are sufficient. When a non-conductive material is employed, such as a polymer, dielectric material, or insulating composite material, then conductive material or metallization (e.g., aluminum, copper, silver, gold, or nickel, among others) can be deposited or plated onto the RF-adjacent surfaces, such as a conductive film. Additionally, various additives or external layers can be included in the materials, such as stabilizers, glass or organic fibers, structural elements, lubricants, release agents, passivation layers, ceramic materials, or other additives.

Turning now to a first example, FIG. 1 is presented. FIG. 1 includes two air cavity view views of aperture assembly 110, namely view 100 and view 101. View 100 is an isometric view of aperture assembly 110, while view 101 is a side view. In FIG. 1, aperture assembly 110 includes two main portions, feed network 111 and horn aperture 150. Feed network 111 includes ports 121 and 131, feed sections 120 and 130, and polarizer 140. Feed section 120 couples between port 121 and a first port on polarizer 140. Feed section 130 couples between port 131 and a second port on polarizer 140. Polarizer 140 then couples at a shared port to a port of horn aperture 150. In operation, feed sections 120 and 130 can carry different RF signals or frequency ranges, forming a multimode feed network integrated with horn aperture 150. Ports 121 and 131 are employed as input/output waveguide ports which couple RF signaling with respect to horn aperture 150.

Feed sections 120 and 130 each include an iris coupled waveguide filter (e.g., 122, 132) positioned between two corresponding waveguide stubs. Specifically, feed section 120 includes filter 122, first stub 123, and second stub 124. Feed section 130 includes filter 132, first stub 133, and second stub 134. Filters 122 and 132 each comprise iris-coupled resonant cavities, with six (6) cavities included per filter, although the quantity can be selected to achieve a target rejection level for out of band signaling. The combination of resonant cavities and irises in filters 122 and 132 form filter arrangements, namely a bandpass filter, which preferentially propagates RF energy having frequencies over a selected bandwidth. RF energy outside of the bandpass is attenuated to a particular degree.

The irises comprise geometric discontinuities, or apertures, in a waveguide structure forming the associated filter, and can take various configurations based on the desired RF behavior. For example the iris-separated resonant cavities for each filter can have sizing of λ/2. In the example shown in FIG. 1, irises establish discontinuities in the H-plane with reduced width edges parallel to the electric field (E field) which excites evanescent TE modes and forms a shunted inductor-equivalent (L) circuit configuration in a waveguide. Other examples can have discontinuities in the E-plane with reduced width edges parallel to the magnetic field (H field) which excites evanescent TM modes and forms a shunted capacitor-equivalent (C) circuit configuration in a waveguide. Yet other examples can include combinations of H/E plane discontinuities for parallel or series coupled LC circuit components.

In addition, various folds or bends are included in feed sections 120 and 130. A first bend configuration includes folds in corresponding E-planes of filters 122 and 132 to form planar serpentine configurations that can fit within an envelope of a footprint of horn aperture 150. The E-plane bends can be located in the series of iris-coupled resonant cavities at zero-current regions. A second bend configuration for feed sections 120 and 130 includes folds in corresponding H-planes to couple filters 122 and 132 to various ports. This second bend configuration is illustrated in later Figures more clearly due to the particular rotation selected for FIG. 1. Thus, feed sections 120 and 130 comprise first H-plane bends coupled to corresponding feed ports arranged perpendicularly to an associated filter, and second H-plane bends coupled to corresponding polarizer ports arranged perpendicularly to the associated filter. These various folds establish a compact footprint for the iris-coupled waveguide filter and stubs, while still having in-line ports for aperture assembly 110. Also, the folding of the filters along the E-plane enables a clean zero-current region split plane through the full iris-couple waveguide filters.

Stubs 123, 124, 133, and 134 comprise sections of waveguide connected at one end to a corresponding portion of the iris-couple waveguide filter forming resonant cavities that are short-circuited (i.e., closed) at a distal end. Stubs 123, 124, 133, and 134 each establish a circuit element equivalent to an LC resonant circuit. The stub arrangement shown in FIG. 1 can provide for dual pole H-plane (H-wall) zeros for each among feed sections 120 and 130. Specifically, a first transmission zero (low-side null) is established by a stub proximate to an input/output port and a second transmission zero (high-side null) is established by a stub proximate to a polarizer port. When both feed sections 120 and 130 are considered, feed network 111 provides at least four rejection nulls with frequency configurations selected among high side rejection nulls and low side rejection nulls with respect to a corresponding waveguide filter bandpass frequency range. The frequency characteristics of the stubs and zeros/nulls are based in part on the sizing of resonant cavities forming stubs 123, 124, 133, and 134, among other factors, and the low-side/high-side frequencies are with respect to a bandpass filter characteristic of the corresponding filter sections. Stubs 123, 124, 133, and 134 are oriented perpendicular to filters 122 and 132, while being generally parallel to horn aperture 150. Thus, these stubs are arranged within a footprint or spatial envelope of the RF aperture diameter of horn aperture 150.

Continuing through feed network 111, polarizer 140 comprises a waveguide body housing a septum feature, namely septum 145. Two ports are positioned at a longitudinal end of the waveguide body having septum 145, and a shared port is positioned on an opposite longitudinal end of the waveguide body. Polarizer 140 can be referred to as a septum polarizer or a septum orthomode transducer (OMT) in some examples. Polarizer 140 couples at the shared port to a port of horn aperture 150. Horn aperture 150 includes RF aperture 151 and various flared features which transition a cross-sectional diameter from the port of horn aperture 150 to RF aperture 151. Horn aperture 150 can comprise a multimode horn aperture.

Septum 145 forms a conductive ridge of material that bisects a portion of a waveguide forming polarizer 140 along a longitudinal axis for a selected length. Septum 145 includes several steps of decreasing height relative to a 'floor' of the polarizer waveguide. The quantity and configuration of steps of septum 145 can be selected to match impedance along the longitudinal axis of polarizer 140, among other considerations. However, in this example, septum 145 includes three (3) steps. Septum 145 establishes an equal power split among ports at a first longitudinal end of polarizer 140 and establishes a phase shift (relative phases of +90° and) −90° among RF signals propagated by these ports. Polarizer 140 also includes a step down in cross-sectional waveguide diameter between the shared port and an input port of the horn aperture, labeled as feature 142. Step down 142 comprises a reduced cross-sectional diameter selected to attenuate selected "higher order" propagation modes, such as TM11 and TE11 modes.

The various elements of aperture assembly 110 can be formed with waveguides or waveguide segments/sections. Material thicknesses of the various waveguide and horn features can be selected based on various RF performance factors, which can further depend on the material selected and manufacturing process selected. Various flanges can be employed to couple ports 121 and 131 to other upstream components, such as further filters, amplifiers, feed elements, electronics, beamforming equipment, or other elements.

The examples herein employ rectangular cross-sectional configurations for ports 121 and 131, as well as for ports on polarizer 140 and horn aperture 150. Also, pentagonal waveguide cross-sectional configurations are employed for filters 122 and 132, as well as the various stubs, with the pentagonal cross-sections aligned with a longitudinal axis of aperture assembly 110. The pentagonal cross-sectional shapes have a steeple configuration. The pentagonal cross-sections employed herein can include irregular (but bilaterally symmetric) pentagons having two longest sides generally parallel to each other, with two additional sides of equal length and shorter than the parallel sides, and one final side spanning the same distance as the two additional sides. Thus, the pentagonal shape has a generally rectangular envelope, with three sides joined with right angles (approximately) 90° and two sides joined by acute angles (e.g., approximately) 45°. The steeple-shaped pentagonal cross-sections of the various waveguides along can provide enhanced manufacturability for certain AM techniques, 3D printing, and manufacturing build directions (such as that noted in view 101 of FIG. 1). However, various other cross-sectional shapes might be employed, such as rectangular, square, hexagonal, octagonal, circular, triangular, irregular, and others.

Aperture assembly 110 can be formed from monolithic workpieces or formed into a single monolithic piece of material to establish horn aperture 150 integrated with feed network 111 comprising ports, feed sections 120 and 130 with polarizer 140. Aperture assembly 110, or subassemblies thereof, can be formed using an additive manufacturing (AM) technique, also referred to as 3D printing. AM techniques can include various manufacturing processes suitable for metal or metal alloy materials such as Direct Metal Laser Sintering (DMLS), stereolithography (SLA), selective laser sintering (SLS), among others. Other examples include polymer or non-conductive material 3D printing which then have RF-contacting surfaces coated, plated, or deposited with layers of conductive material. Thus, while the specific AM techniques employed can vary, the enhanced waveguide and aperture structures discussed herein can provide desired performance over selected frequency ranges. Materials selected for aperture assembly 110 include various conductive materials, such as metals, metal alloys, aluminum, copper, nickel, magnesium, steel, or other materials, including alloys thereof. In other examples, a non-conductive or polymer material can be employed, with surface coatings, platings, or treatments used to apply a conductive layer onto RF-contacting surfaces. Thus, aperture assembly 110 can have internal/external surfaces which are conductive for RF energy propagated through corresponding waveguide cavities.

Figure 8:
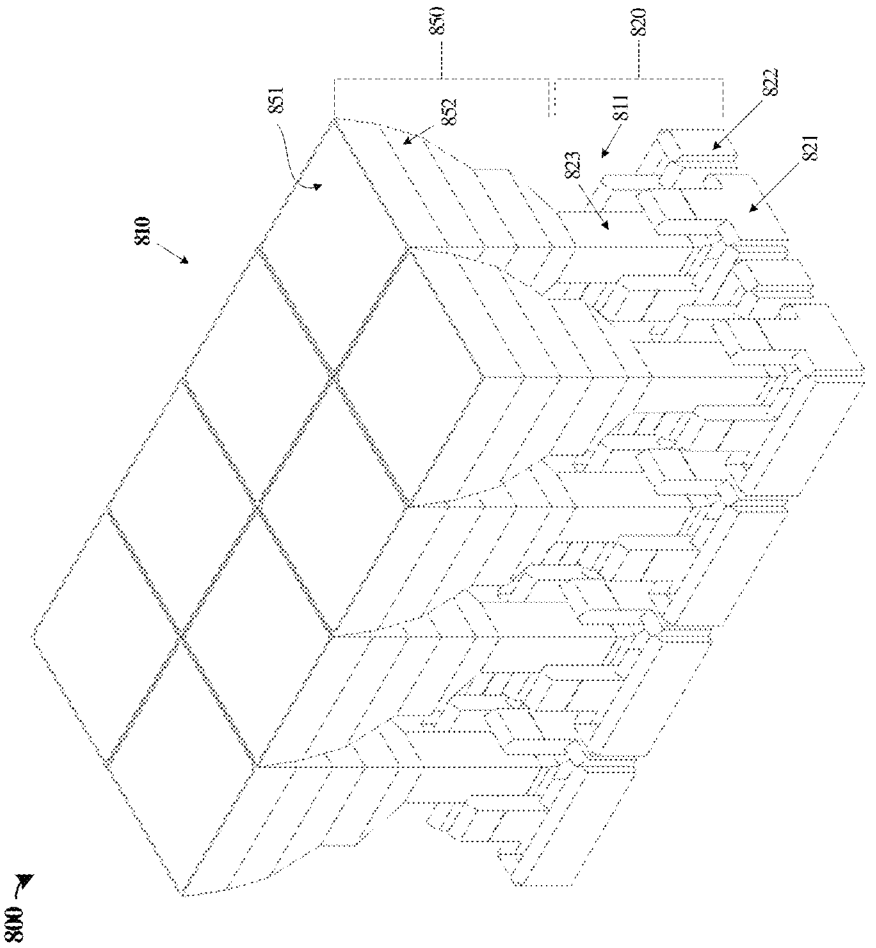
FIG. 8 illustrates an array of aperture antenna assemblies in an implementation.

Advantageously, this AM or 3D printed configuration can significantly reduce assembly, integration and test (AI&T). The 3D printed structures also can provide a monolithic, continuous waveguide and subarray assembly structure to reduce passive intermodulation modulation (PIM) risk by eliminating joints and discontinuities to reduce or eliminate PIM sources that otherwise may degrade antenna gain-to-noise-temperature (G/T) and interfere with other co-site receivers. This is an additional and significant advantage of integrated apertures (horn/feed network) described herein using a 3D printed single monolithic workpiece. Furthermore, a monolithic 3D printed workpiece can include multiple apertures in the same workpiece to form arrays or subarrays, such as shown in FIG. 8. These arrays or subarrays can include one or more sets of horn apertures, polarizers, and filters, among other waveguide and aperture components.

Figure 2:
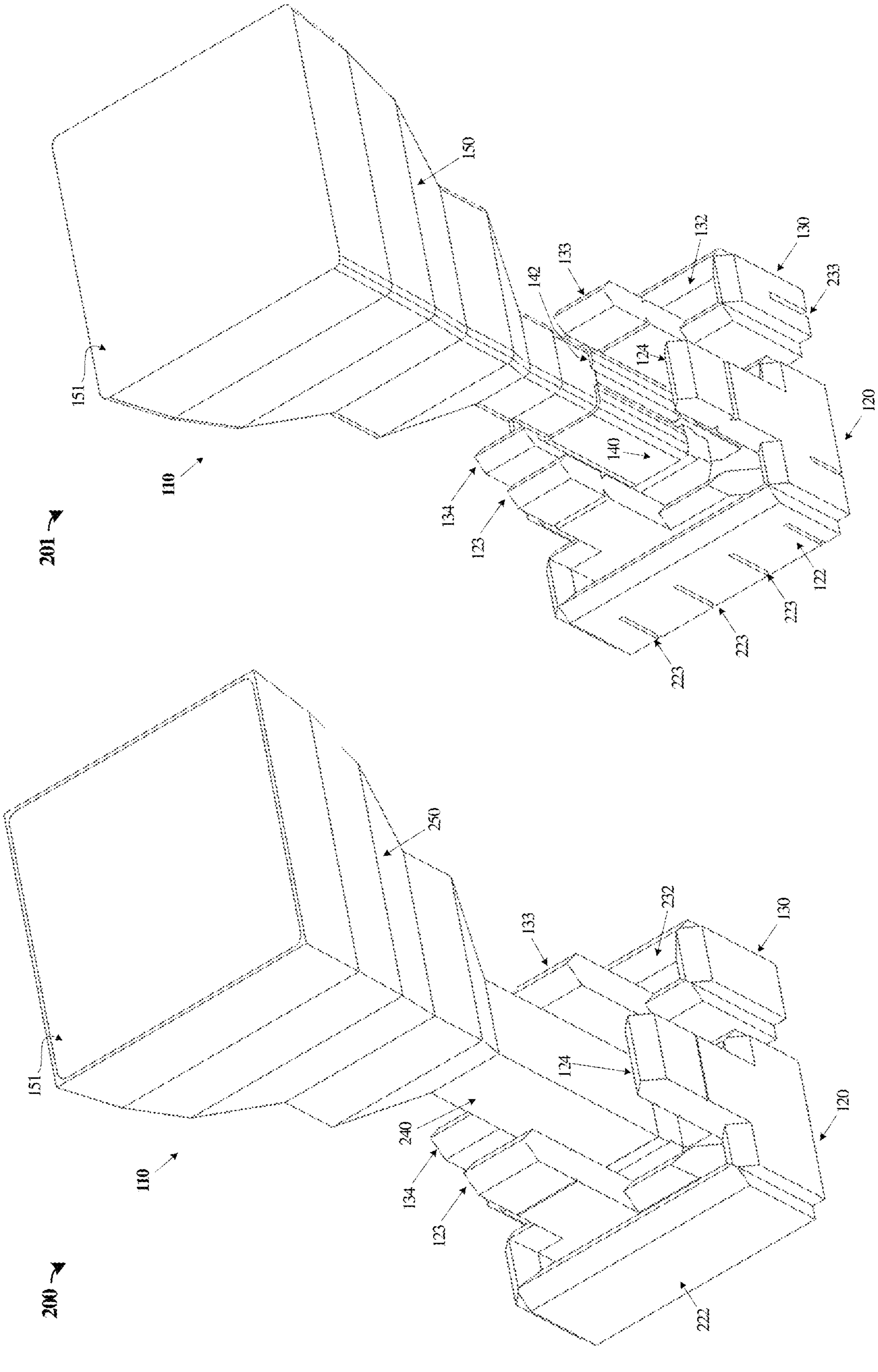
FIG. 2 illustrates an aperture antenna assembly in an implementation.
Figure 3:
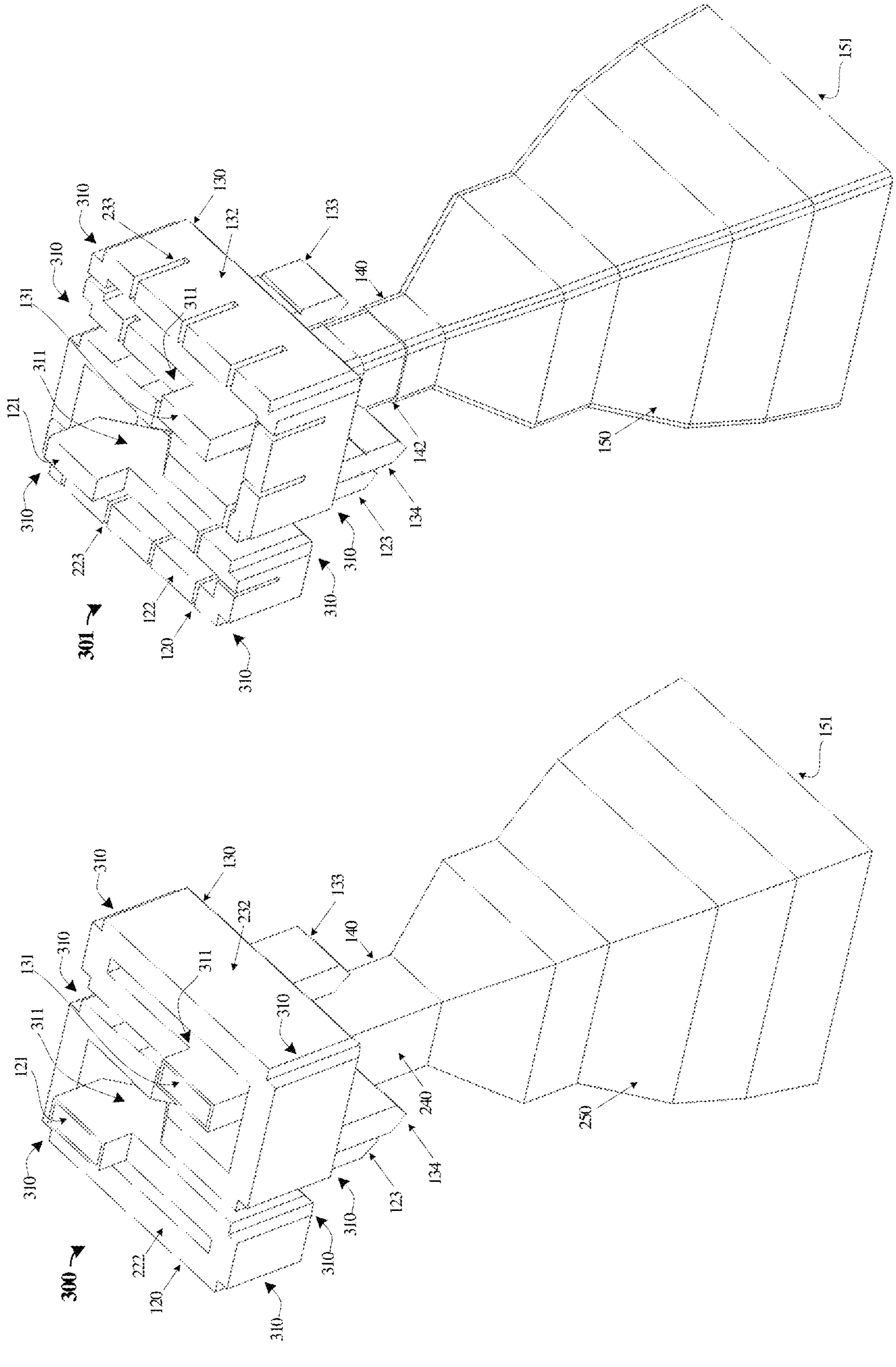
FIG. 3 illustrates an aperture antenna assembly in an implementation.

Turning now to further views and discussion of aperture assembly 110, FIGS. 2 and 3 are presented. FIGS. 2 and 3 include views that highlight the differences between a manufactured configuration and corresponding air cavity elements. Specifically, FIG. 2 includes manufactured view 200 and air cavity view 201 which show a top-down isometric viewpoint, and FIG. 3 includes manufactured view 300 and air cavity view 301 which show a bottom-up isometric viewpoint.

As shown in view 200, material forms a body of aperture assembly 110, such as waveguide walls, aperture walls, and other various structures. This material defines air cavities shown in view 201, which defines the RF-active regions or volumes of aperture assembly 110. Although the material of the manufactured configuration in view 200 can comprise conductive material, such as a metal or metal alloy, other examples might instead have non-conductive material with RF-adjacent surfaces having conductive material applied thereto. Among these RF regions include horn aperture body 250 which defines horn aperture 150, polarizer body 240 which defines polarizer 140, feed section bodies 222 and 232 which define feed sections 120/130 along with example irises 223/233. Additional features are labeled in FIG. 2, such as stubs 123, 124, 133, and 134.

View 300 shows a feed/port side of aperture assembly 110, with ports 121 and 131 visible. View 301 shows the air cavity portions of ports 121 and 131. Bends are included to establish ports 121 and 131 as inline with horn aperture 110 and a longitudinal axis of aperture assembly 110, or perpendicular to filters 122 and 132. These bends 311 comprise H-plane bends coupled to corresponding feed ports 121 and 131 arranged perpendicularly to associated waveguide filters 122 and 132, and arranged inline or parallel to polarizer 140. Views 300 and 301 highlight the various folds or bends are included in feed section bodies 222 and 232 (e.g., feed sections 120 and 130). Bends 310 include folds in corresponding E-planes of filters 122 and 132 to form planar serpentine configurations that can fit within an envelope of a footprint of horn aperture body 250. Further bends are included to couple filters 122 and 132 to ports of polarizer 140, namely H-plane bends that allow perpendicular coupling of filters 122 and 132 to ports of polarizer 140.

Figure 4:
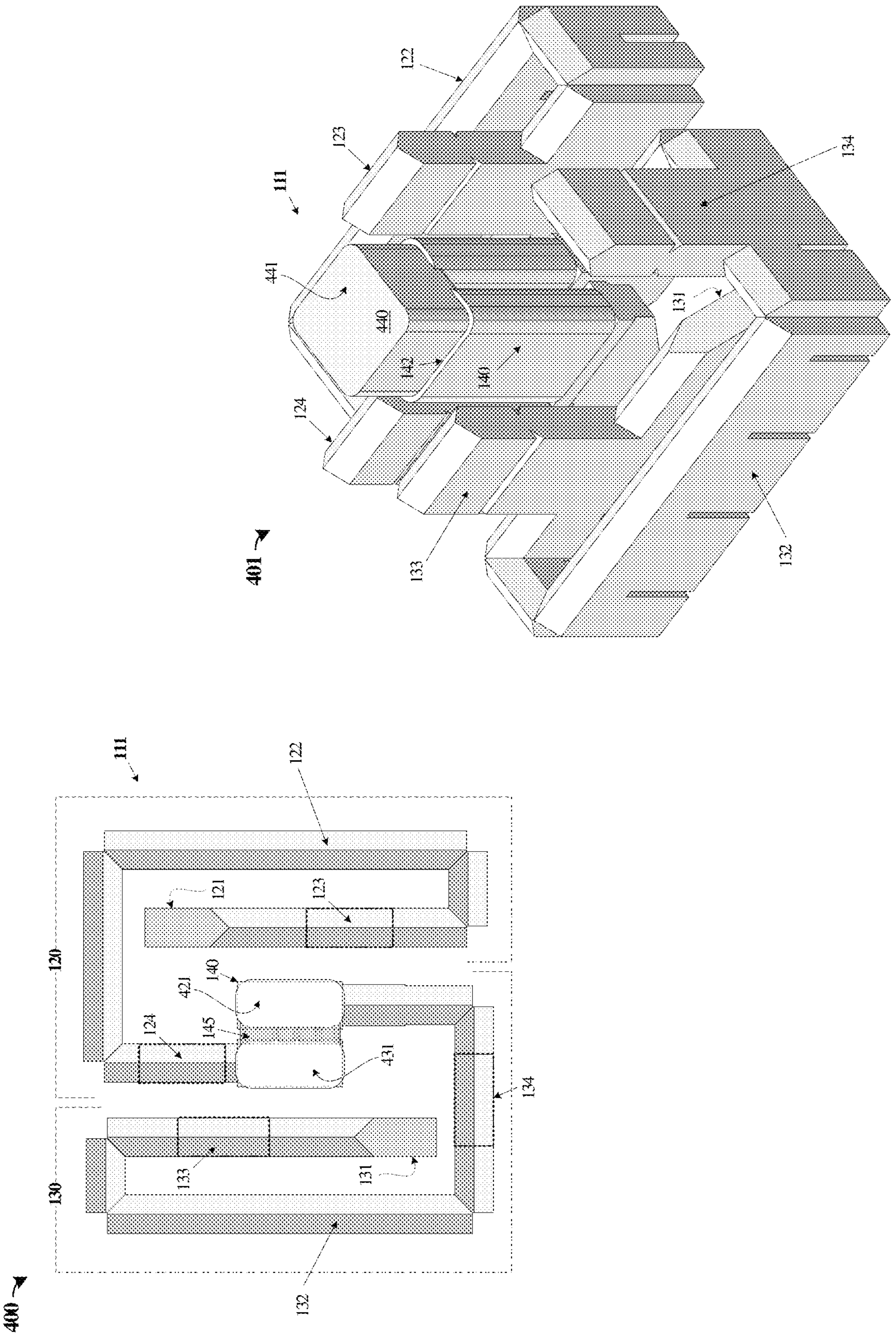
FIG. 4 illustrates a feed network for an aperture antenna assembly in an implementation.

FIG. 4 illustrates two air cavity views 400 and 401 of feed network 111. Horn aperture 150 (or horn aperture body 250) has been omitted from FIG. 4 for clarity. View 400 shows an end view (top down) of feed network 111, with various features visible and labeled. Additionally, polarizer ports 421 and 431 are visible, along with septum 145. Feed section 120 couples to polarizer port 421, and feed section 130 couples to polarizer port 431. The serpentine configuration of feed sections 120 and 130 are also apparent in view 400. View 401 shows an isometric view of feed network 111, with polarizer step down 142 visible for polarizer 140, as well as polarizer waveguide cavity 440 and shared port 441. Shared port 441 couples to horn aperture 150.

When Tx/Rx signaling is carried by aperture assembly 110 for full duplex operation, FIG. 4 can illustrate feed network 111 comprising a transmit (Tx) feed section (120) coupled between a transmit feed port (121) and a transmit polarizer port (421) of a polarizer (140) and comprising a transmit waveguide filter (122) and transmit waveguide stubs (123, 124) establishing first transmission zeros. Furthermore, a receive (Rx) feed section (130) coupled between a receive feed port (131) and a receive polarizer port (431) of the polarizer (140) and comprising a receive waveguide filter (132) and receive waveguide stubs (133, 134) establishing second transmission zeros. Also, the polarizer (140)

comprises a stepped septum (145) positioned between the transmit polarizer port (421) and the receive polarizer port (431) and having a shared port (441) coupled to a horn aperture (150).

Figure 5:
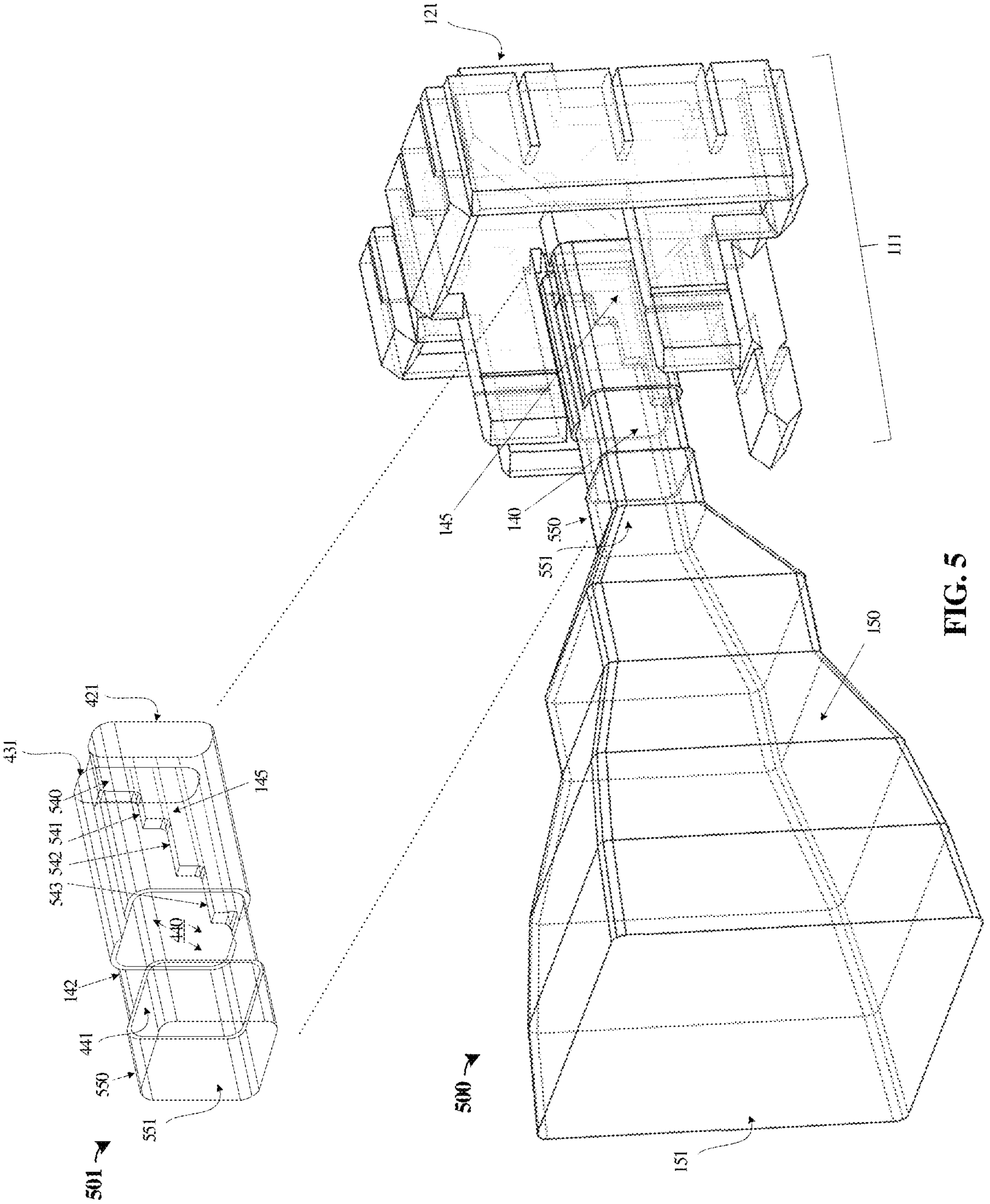
FIG. 5 illustrates a polarizer for an aperture antenna assembly in an implementation.

FIG. 5 illustrates additional views of polarizer 140 of aperture assembly 110 and relative placement of polarizer 140 in aperture assembly 110 between horn aperture 150 and other portions of feed network 111. View 500 shows a wireframe view of aperture assembly 110, revealing various internal features, such as those of polarizer 140. View 501 shows polarizer 140 with a short portion of horn aperture 150.

As can be seen for polarizer 140 in view 501, a rounded rectangular shape is employed for each of polarizer ports 421 and 431, with these shapes continued for a portion of the length of polarizer 140. Septum 145 separates polarizer ports 421 and 431 at a first longitudinal end of polarizer 140, and steps down in height from initial height 540 over three step downs in height 541, 542, and 543 until reaching a waveguide floor of polarizer 140. Then, a straight section of waveguide is included at diameter step down 142 having a smaller diameter than that of the remainder of polarizer 140. Shared port 441 is included at the terminal end of this straight section of waveguide. From here, a first portion of horn aperture 150 is included, namely aperture section 550 that couples at location 551 to a first flared section of horn aperture 150. Further flared sections of horn aperture 150 increase the cross-sectional diameter of horn aperture 150 until RF aperture 151.

Figure 6:
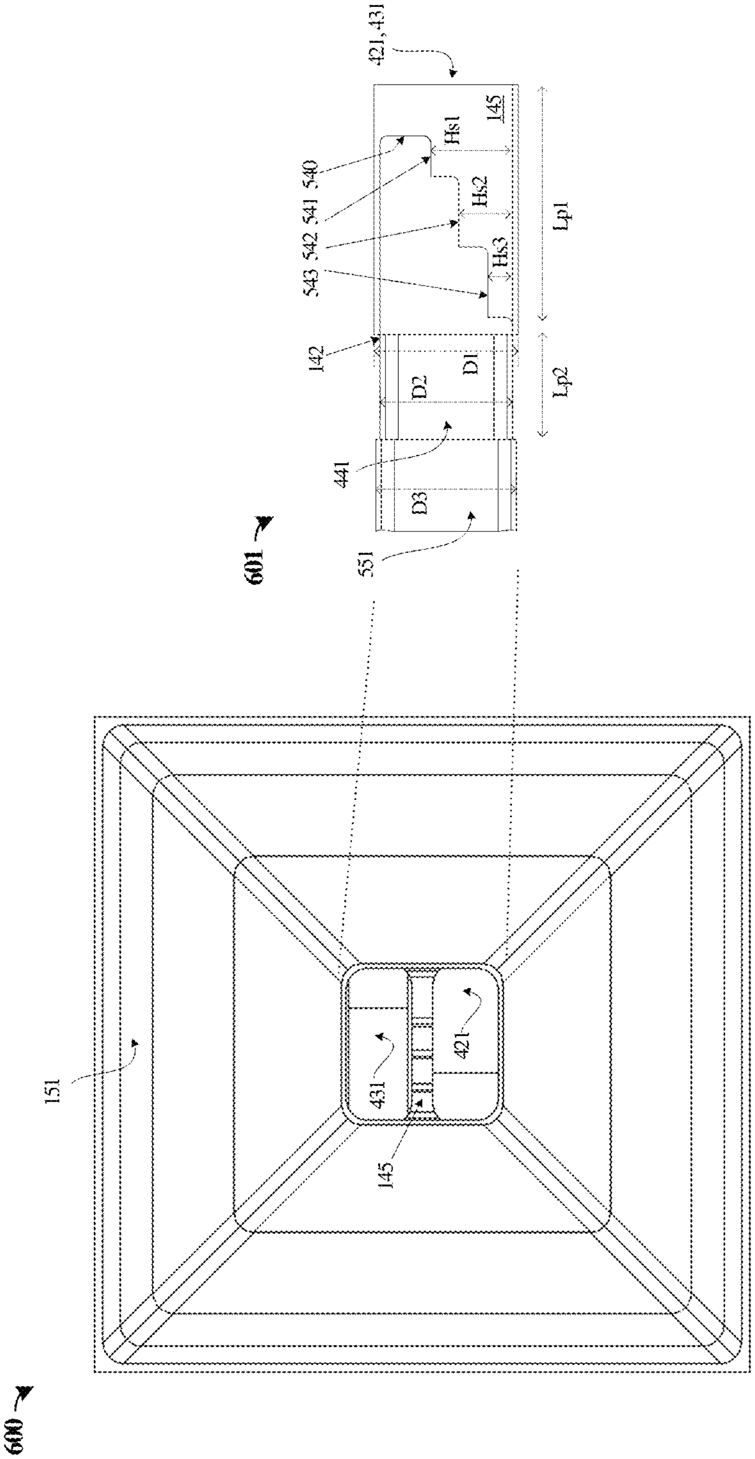
FIG. 6 illustrates a polarizer for an aperture antenna assembly in an implementation.

FIG. 6 illustrates further views of aperture assembly 110 to highlight various geometric properties of polarizer 140. View 600 is an end view looking down the flared volume of horn aperture 150 from RF aperture 151. In this view, the decreased in flared diameter is seen, as well as shared port 441 which couples polarizer 140 to horn aperture 150. Internal to polarizer 140 is stepped septum 145 as well as polarizer ports 421 and 431.

View 601 is a side view showing internal portions of polarizer 140. Septum 145 separates polarizer ports 421 and 431 at a first longitudinal end of polarizer 140, and steps down in height from initial full height 540 covering the full diameter of polarizer 140, over three step downs in height 541 (Hs1), 542 (Hs2), and 543 (Hs3) until reaching a waveguide floor of polarizer 140 after length Lp1. The three step downs comprise step discontinuities in septum 145, and can have various transition geometries, such as the fillets shown herein, among other transitions including tapers, chamfers, or bevels to each successive step as well as to the floor/side walls of polarizer 140. Septum 145 thus covers a longitudinal length of Lp1 shown in view 601.

Then, a section of waveguide having length Lp2 is included at diameter step down 142 which provides a smaller diameter (D2) than that of the initial portion of polarizer 140 (D1). Shared port 441 is included at the terminal end of this step-down section of waveguide. From here, a first portion of horn aperture 150 is included, namely aperture section 550 which can have a different diameter (D3) that couples at location 551 to a first flared section of horn aperture 150. Further flared sections of horn aperture 150 increase the cross-sectional diameter of horn aperture 150 until RF aperture 151.

Figure 7:
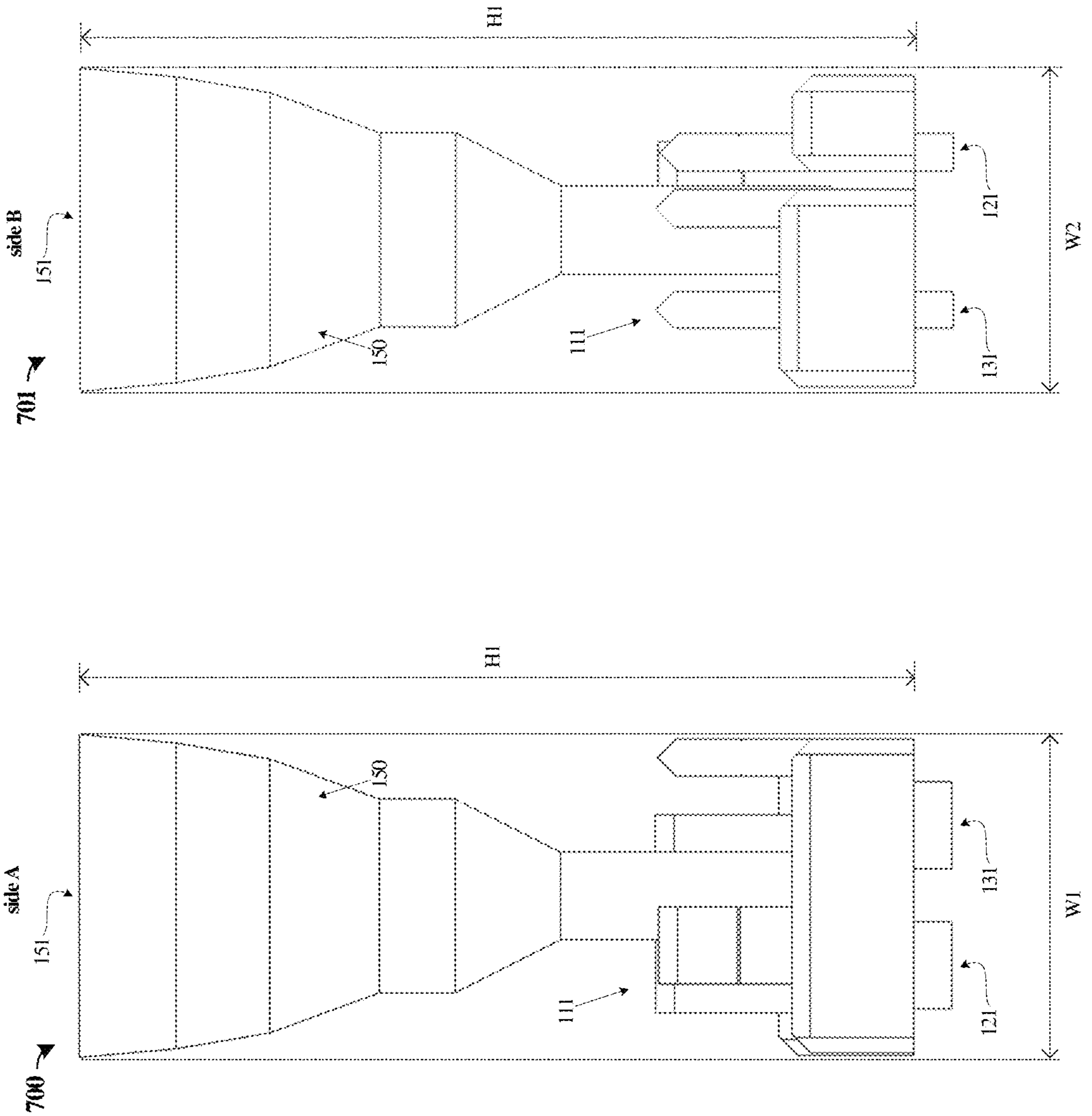
FIG. 7 illustrates a mechanical envelope of an aperture antenna assembly in an implementation.

FIG. 7 illustrates further views of aperture assembly 110 to highlight various geometric relationships between feed network 111 and horn aperture 150. View 700 is a first size (A) view of aperture assembly 110, and view 701 is a second side (B) view of aperture assembly 110. Both view 700 and 701 are manufactured views which have corresponding internal waveguide air cavities.

Ports 121, 131 are visible at a bottom end of aperture assembly 110, and the overall height of these ports may vary based on implementation, thus the various metrics noted in FIG. 7 omit the port lengths for clarity. Thus, aperture assembly 110 has an overall height H1, as shown measured from a bottom or feed network 111 to RF aperture 151, although variations are possible based on frequency range, mechanical envelope, materials selected, and other factors. A first side (A) overall width of W1 is shown, with a second side (B) overall width of W2, which is defined by the width of horn aperture 150 in this example. Widths W1 and W2 can be of the same width (e.g., square RF aperture 151), but may also be different. A footprint of horn aperture 150 is defined by W1 and W2, and feed network 111 is shown as fitting within this footprint projected downward, forming a physical envelope. In some examples, W1 and W4 are each approximately 4 inches, for an X-band frequency range, and H1 is approximately 10.5 inches. Advantageously, the two waveguide filters having the planar folded configuration (in corresponding E-planes) establish a planar serpentine filter routing disposed within an envelope of a footprint of horn aperture 150 (W1 x W2).

FIG. 8 illustrates array 810 of aperture antenna assemblies in an implementation. In some examples, array 810 might be included with other instances of array 810 into a larger array (e.g., ESA), and in such cases array 810 can be referred to as a subarray. array 810 includes a tightly packed arrangement of aperture assemblies, each having a horn aperture and integrated feed network positioned within a footprint of the horn aperture. This provides for an array without significant gapping between RF apertures and assemblies which are compact in spatial extent (vertically and horizontally) for large RF aperture arrays. Not shown in FIG. 8 are various upstream components which would couple on a bottom end to ports of each aperture assembly.

Example aperture assembly 811 has labeled components, which are repeated similarly for each aperture assembly. Notably, aperture assembly 811 includes feed network 820 having Tx feed 821 and Rx feed 822. Feed network 820 includes iris filters and stub waveguide elements providing transmission zeros, and each feed has two transmission zeros provided by these stub waveguide elements, along with the bandpass filtering provided by the iris-coupled filters. When different frequencies are selected for Tx/Rx signaling, a full duplex concurrent Tx/Rx operation can be achieved through RF aperture 851 of multimode horn aperture 850.

Similar materials and manufacturing techniques can be employed for array 810 and individual aperture assemblies as discussed herein for aperture assembly 110. For example, individual aperture assemblies can be 3D printed and then later joined to form array 810. In other examples, more than one instance of aperture assembly can be 3D printed into a monolithic integrated part, such that one or more aperture assemblies are used to form array 810.

Subarray 810 can provide enhanced full duplex Tx/Rx operation from a shared set of antenna apertures forming an antenna array. Various beamforming configurations can be established with ESA functionality for both Tx and Rx signaling. The subarray can be included into a larger array and provide steerable beams independently scanned about a boresight. Further equipment can be included to handle Tx/Rx signaling with respect to subarray 810, such as amplifiers, filters, beamforming equipment, power systems, digital control elements, status and monitoring equipment, and RF communication elements, among other elements and equipment.

The frequency ranges for the RF links, waveguides, filters, polarizers, ports, connections, apertures, antennas, components, configurations, systems, and arrangements herein include various RF bands, such as microwave frequencies capable of transiting RF waveguide structures. Different frequency bands can be supported by similar architectures as shown herein, with associated geometry scaling to suit the selected frequency ranges. While the examples herein cover portions of the RF bands noted above, examples might include the X band (approximately 8 to 12 GHZ), or the Ka band and Ku band or other portions of the K bands (approximately 12 to 40 GHz). Other examples might be configured to support frequency ranges, or portions thereof, corresponding to the IEEE bands of S band, L band, C band, X band, Ku band, K band, Ka band, V band, W band, among others, including combinations thereof. Other example RF frequency ranges and service types include ultra-high frequency (UHF), super high frequency (SHF), extremely high frequency (EHF), or other parameters defined by different organizations. In addition, various frequency bands associated with communication technology, such as Wi-Fi and 4G/5G cellular communications can be employed. These include the IEEE 802.11 family of frequency bands (Wi-Fi), and the 4G/5G broadband cellular network frequency bands including the low band (600 to 700 MHz), mid band (1.7 GHz to 2.5 GHZ), high band (24 to 100 GHz (mmWave)) defined by the 3rd Generation Partnership Project (3GPP) and other organizations.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The various materials and manufacturing processes discussed herein are employed according to the descriptions above. However, it should be understood that the disclosures and enhancements herein are not limited to these materials and manufacturing processes, and can be applicable across a range of suitable materials and manufacturing processes. Thus, the descriptions and figures included herein depict specific implementations to teach those skilled in the art how to make and use the best options. For the purpose of teaching inventive principles, some conventional aspects have been simplified or omitted. Those skilled in the art will appreciate variations from these implementations that fall within the scope of this disclosure. Those skilled in the art will also appreciate that the features described above can be combined in various ways to form multiple implementations.

What is claimed is:

1. A apparatus, comprising:

a horn aperture having a footprint projected along a longitudinal axis, and integrated with a multimode feed network disposed within an envelope of the footprint;

the multimode feed network comprising:

a first feed section having a folded serpentine arrangement and coupled between a first feed port and a first polarizer port of a polarizer, the first feed section comprising a first waveguide filter perpendicular to the polarizer and first waveguide stubs parallel to the polarizer establishing first transmission zeros;

a second feed section having a folded serpentine arrangement and coupled between a second feed port and a second polarizer port of the polarizer, the second feed section comprising a second waveguide filter perpendicular to the polarizer and second waveguide stubs parallel to the polarizer establishing second transmission zeros; and the polarizer comprising a stepped septum positioned between the first polarizer port and the second polarizer port and having a shared port coupled to the horn aperture.

2. The apparatus of claim 1, wherein the first waveguide filter and the second waveguide filter correspond to different bandpass frequencies and comprise a series of iris-coupled resonant cavities.

3. The apparatus of claim 2, wherein the iris-coupled resonant cavities comprise H plane iris discontinuities.

4. The apparatus of claim 1, wherein the first waveguide filter and the second waveguide filter are folded in corresponding E-planes in the folded serpentine arrangement and disposed within the envelope of the footprint of the horn aperture.

5. The apparatus of claim 4, wherein the first feed section and the second feed section comprise first H-plane bends coupled to corresponding feed ports arranged perpendicularly to an associated waveguide filter; and wherein the first feed section and the second feed section comprise second H-plane bends coupled to corresponding polarizer ports arranged perpendicularly to the associated waveguide filter.

6. The apparatus of claim 1, wherein the first transmission zeroes and the second transmission zeros comprise at least four rejection nulls with frequency configurations selected among high side rejection nulls and low side rejection nulls with respect to a corresponding waveguide filter bandpass frequency range; and wherein the configuration of the four rejection nulls is established based at least on sizing of cavities and irises of the corresponding waveguide filter.

7. The apparatus of claim 1, wherein the horn aperture integrated with the multimode feed network comprises a monolithic workpiece of material formed by an additive manufacturing process.

8. The apparatus of claim 7, wherein cross-sectional areas of the first feed section and the second feed section comprise pentagonal waveguide shapes.

9. The apparatus of claim 1, wherein the first waveguide stubs and the second waveguide stubs comprise short-circuited resonant cavities aligned perpendicularly to a corresponding waveguide filter.

10. The apparatus of claim 1, wherein the polarizer comprises a step down in cross-sectional waveguide diameter between the shared port and an input port of the horn aperture.

11. The apparatus of claim 10, wherein the step down comprises a reduced cross-sectional diameter selected to attenuate selected propagation modes.

12. The apparatus of claim 1, wherein the stepped septum comprises three steps and establishes a power split among the first polarizer port and the second polarizer port and a phase shift among radio frequency signals propagated by the first polarizer port and the second polarizer port.

13. A method, comprising:
forming a horn aperture having a footprint projected along a longitudinal axis, and integrated with a multimode feed network disposed within an envelope of the footprint;
wherein the multimode feed network comprises:
a first feed section having a folded serpentine arrangement and coupled between a first feed port and a first polarizer port of a polarizer, the first feed section comprising a first waveguide filter perpendicular to the polarizer and first waveguide stubs parallel to the polarizer establishing first transmission zeros;
a second feed section having a folded serpentine arrangement and coupled between a second feed port and a second polarizer port of the polarizer, the second feed section comprising a second waveguide filter perpendicular to the polarizer and second waveguide stubs parallel to the polarizer establishing second transmission zeros; and
the polarizer comprising a stepped septum positioned between the first polarizer port and the second polarizer port and having a shared port coupled to the horn aperture.

14. The method of claim 13, wherein the first waveguide filter and the second waveguide filter correspond to different bandpass frequencies and comprise a series of iris-coupled resonant cavities; and
wherein the iris-coupled resonant cavities comprise H plane iris discontinuities.

15. The method of claim 13, wherein the first waveguide filter and the second waveguide filter are folded in corresponding E-planes in the folded serpentine arrangement and disposed within the envelope of the footprint of the horn aperture;
wherein the first feed section and the second feed section comprise first H-plane bends coupled to corresponding feed ports arranged perpendicularly to an associated waveguide filter; and
wherein the first feed section and the second feed section comprise second H-plane bends coupled to corresponding polarizer ports arranged perpendicularly to the associated waveguide filter.

16. The method of claim 13, wherein the horn aperture integrated with the multimode feed network comprises a monolithic workpiece of material formed by an additive manufacturing process; and
wherein cross-sectional areas of the first feed section and the second feed section comprise pentagonal waveguide shapes.

17. The method of claim 13, wherein the polarizer comprises a step down in cross-sectional waveguide diameter between the shared port and an input port of the horn aperture; and
wherein the step down comprises a reduced cross-sectional diameter selected to attenuate selected propagation modes.

18. The method of claim 13, wherein the stepped septum comprises three steps and establishes a power split among the first polarizer port and the second polarizer port and a phase shift among radio frequency signals propagated by the first polarizer port and the second polarizer port.

19. A radio frequency aperture assembly, comprising:
a horn aperture having a footprint projected along a longitudinal axis; and
a feed network disposed within an envelope of the footprint, the feed network comprising:
a transmit feed section having a folded serpentine arrangement and coupled between a transmit feed port and a transmit polarizer port of a polarizer, the transmit feed section comprising a transmit waveguide filter perpendicular to the polarizer and transmit waveguide stubs parallel to the polarizer establishing first transmission zeros;
a receive feed section having a folded serpentine arrangement and coupled between a receive feed port and a receive polarizer port of the polarizer, the receive feed section comprising a receive waveguide filter perpendicular to the polarizer and receive waveguide stubs parallel to the polarizer establishing second transmission zeros; and
the polarizer comprising a stepped septum positioned between the transmit polarizer port and the receive polarizer port and having a shared port coupled to the horn aperture.

20. The radio frequency aperture assembly of claim 19, comprising:
the transmit waveguide filter and the receive waveguide filter comprising the folded serpentine arrangement in corresponding E-planes to establish routing disposed within the envelope of the footprint of the horn aperture;
the transmit feed section and the receive feed section comprising first H-plane bends coupled to corresponding feed ports arranged perpendicularly to an associated waveguide filter;
the transmit feed section and the receive feed section comprising second H-plane bends coupled to corresponding polarizer ports arranged perpendicularly to the associated waveguide filter; and
the transmit waveguide stubs and the receive waveguide stubs comprising short-circuited resonant cavities aligned perpendicularly to a corresponding waveguide filter.

* * * * *